US008536814B2

(12) United States Patent
Mazumdar et al.

(10) Patent No.: US 8,536,814 B2
(45) Date of Patent: Sep. 17, 2013

(54) LIMITING PEAK ELECTRICAL POWER DRAWN BY MINING EXCAVATORS

(75) Inventors: Joy Mazumdar, Norcross, GA (US);
Walter Köllner, Suwanee, GA (US);
Andreas Holweck, Erlangen (DE);
Michael G. Onsager, Franklin, WI (US); Ekkehard Pittius, Roth (DE)

(73) Assignees: Siemens Industry, Inc., Alpharetta, GA (US); Caterpillar Global Mining LLC, Oak Creek, WI (US); Siemens Aktiengesellschaft, München (DE)

( * ) Notice: Subject to any disclaimer, the term of this patent is extended or adjusted under 35 U.S.C. 154(b) by 2 days.

(21) Appl. No.: 13/466,802

(22) Filed: May 8, 2012

(65) Prior Publication Data

US 2012/0257424 A1 Oct. 11, 2012

Related U.S. Application Data

(63) Continuation of application No. 12/466,722, filed on May 15, 2009, now Pat. No. 8,174,225.

(51) Int. Cl.
*H02P 1/00* (2006.01)
(52) U.S. Cl.
USPC ............................ 318/440; 318/376; 318/434
(58) Field of Classification Search
USPC ......... 318/376, 440, 434, 433, 432; 320/167; 361/502; 363/34
See application file for complete search history.

(56) References Cited

U.S. PATENT DOCUMENTS

| 4,358,719 | A | 11/1982 | Currier et al. |
|---|---|---|---|
| 6,742,630 | B2 | 6/2004 | Eilinger |
| 7,137,344 | B2 | 11/2006 | Kumar et al. |
| 2003/0151387 | A1 | 8/2003 | Kumar |
| 2006/0061307 | A1 | 3/2006 | Donnelly |
| 2009/0039809 | A1* | 2/2009 | Takeuchi ............... 318/400.09 |
| 2011/0175579 | A1 | 7/2011 | Mazumdar |

FOREIGN PATENT DOCUMENTS

| EP | 1126085 A1 | 8/2001 |
|---|---|---|
| EP | 1452710 A1 | 9/2004 |
| EP | 1571352 A1 | 9/2005 |

* cited by examiner

*Primary Examiner* — Karen Masih (57) ABSTRACT

The maximum electrical power drawn from an electrical power source by a mining excavator comprising electric motors is reduced by supplying supplementary electrical power from an electrical energy storage unit. The input electrical power drawn by the mining excavator is cyclic. An upper limit is set for the electrical power drawn from the electrical power source. When the input electrical power drawn by the mining excavator exceeds the upper limit, electrical power is supplied by the electrical energy storage unit, such as an ultracapacitor bank. The ultracapacitor bank may be charged by the electrical power source during off-peak intervals. Electrical power generated by electrical motors operating in a regeneration interval may also be recaptured and stored in the electrical energy storage unit.

17 Claims, 12 Drawing Sheets

LIMITING PEAK ELECTRICAL POWER DRAWN BY MINING EXCAVATORS

This application is a continuation of prior application Ser. No. 12/466,722 filed on May 15, 2009, now U.S. Pat. No. 8,174,225, which is herein incorporated by reference in its entirety.

BACKGROUND OF THE INVENTION

The present invention relates generally to electrical power systems, and particularly to systems for limiting peak electrical power drawn by mining excavators from an electrical power source.

Many applications depend on electricity supplied by an electrical power distribution network, such as the electrical power grid operated by an electrical power utility company. Some commercial and industrial applications draw significant power. Loads are often dynamic, and peak power demand may approach, and, in some instances, exceed, the maximum power available from the electrical power distribution network. Excessive peak power demand may lead to voltage sags and temporary outages in the electrical power distribution network. Therefore, not only may the performance and reliability of the application of interest be degraded, but also service to other customers of the electrical power utility company may be disrupted.

One application which draws significant electrical power is mining. In a mining operation, the electrical power distribution network feeds a wide spectrum of loads, ranging from small industrial motors to large draglines. Electrical mining excavators, such as electric shovels and draglines, present a cyclic load to the electrical power distribution network. Although the average power drawn by these machines may be about 55% of their peak power demand, in some instances, the peak power demand may approach the generation limits at the individual feeders providing input power to the machines. For example, an electric shovel may draw peak powers on the order of 3.5 megawatts, and a dragline may draw peak powers on the order of 24 megawatts.

In addition to improved performance and reliability, there is also an economic incentive for reducing peak power demand. Electrical power utility companies supplying power to the mines typically measure the power demand of a mine based on 15-minute intervals, and billing is adjusted for peak power demand during each 15-minute interval. What are needed are method and apparatus for limiting peak power drawn by mining excavators from an electrical power distribution network. Method and apparatus which reduce wasted energy are particularly advantageous.

BRIEF SUMMARY OF THE INVENTION

In an embodiment of the invention, the maximum electrical power drawn from an electrical power source by a mining excavator comprising electric motors is reduced by supplying electrical power from an electrical energy storage unit. The electrical power drawn by the mining excavator is cyclic. An upper limit is set for the electrical power drawn from the electrical power source. When the input power drawn by the mining excavator exceeds the upper limit, additional electrical power is supplied by the electrical energy storage unit.

One embodiment of an electrical energy storage unit is an ultracapacitor bank, which may be charged by the electrical power source when the electrical power drawn by the mining excavator is less than the upper limit. In another embodiment of the invention, electrical power generated by electrical motors operating in a regeneration interval is stored in the electrical energy storage unit.

These and other advantages of the invention will be apparent to those of ordinary skill in the art by reference to the following detailed description and the accompanying drawings.

DETAILED DESCRIPTION

Figure 1:
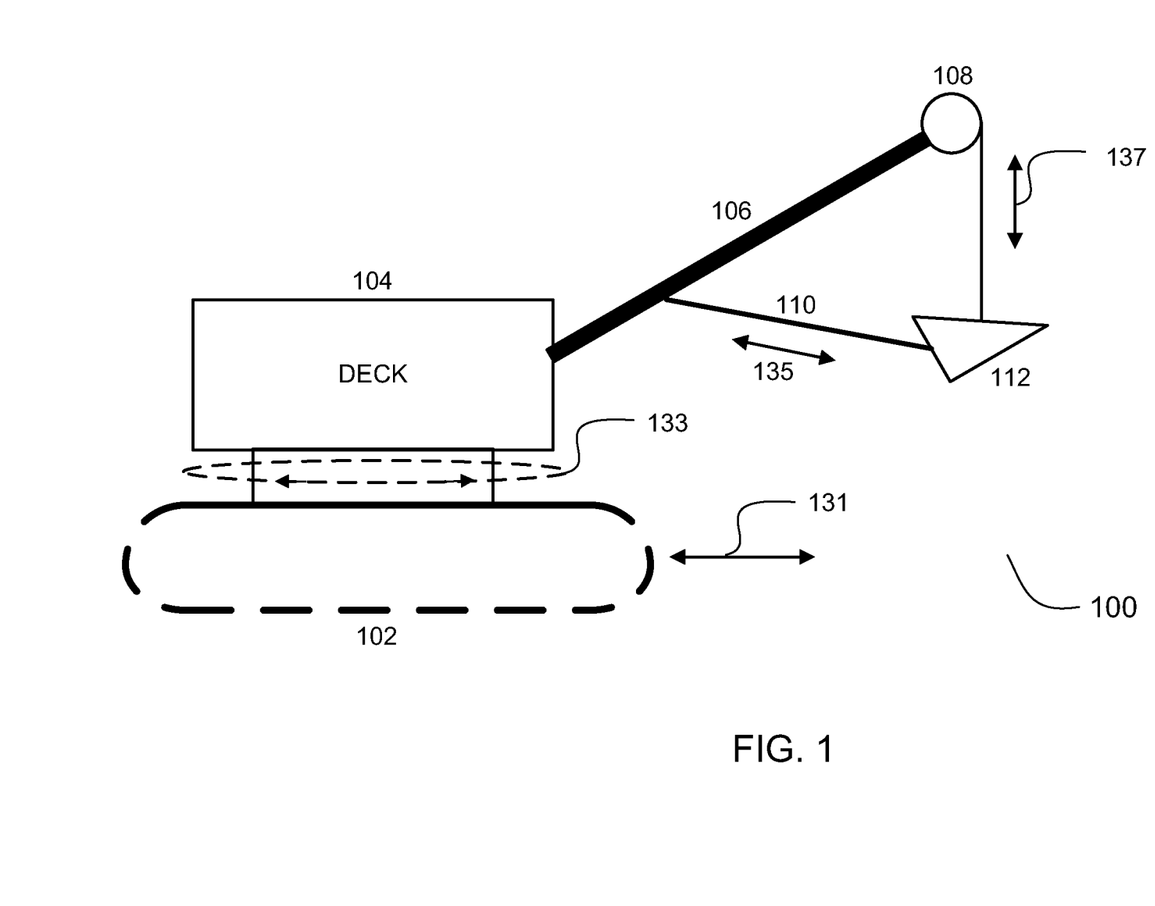
FIG. 1 shows a high-level schematic of an electric shovel.

Mining excavators include electric shovels and draglines. FIG. 1 shows a schematic of an electric shovel 100 to illustrate a mining excavator that consumes significant electrical power. The major components are crawler 102, deck 104, boom 106, hoist 108, handle 110, and dipper 112. Electric motors enable various motions to operate the electric shovel 100. Motion 131 propel (forward/reverse directions) refers to travel of the entire electric shovel 100 with respect to the ground. Motion 133 swing (away/return directions) refers to rotation of deck 104 with respect to crawler 102. Motion 135 crowd (crowd/retract directions) refers to positioning of dipper 112 with respect to boom 106. Motion 137 hoist (hoist/lower directions) refers to positioning dipper 112 up and down with respect to the ground. Multiple electric motors may be used to provide each motion.

An electric shovel typically performs a series of repetitive operations. For example, it may propel forward near a bank, swing the dipper into position, crowd the dipper into the bank, hoist the dipper to scoop out material, retract the dipper, propel in reverse to clear the bank, propel forward to a dump site, swing the dipper into position, lower the dipper, and dump the load. It then returns to the bank and repeats the operation. Motors, then, often accelerate in one direction, brake, and accelerate in the opposite direction. The mechanical load on a motor is highly variable. As one example, consider a motor hoisting a dipper full of heavy material, dumping the material, and lowering an empty bucket.

From an electrical power perspective, an electric shovel presents a cyclic load to an electrical power source. As a function of operating time, the electrical power drawn by the electric shovel varies cyclically. The variation in power may be significant: as previously mentioned, the average power drawn by these machines may be about 55% of their peak power demand.

Under normal operation, an electric motor converts electrical energy into mechanical energy. An electric motor may also be operated in reverse as a generator to convert mechanical energy into electrical energy. Under normal operation, an electric motor draws (consumes) electrical power from an electrical power source. When an electric motor under motion is stopped, the residual mechanical energy may be converted to electrical energy. Herein, a time interval during which an electrical load is drawing electrical energy is referred to as a motoring interval; and a time interval during which an electrical load is generating electrical energy is referred to herein as a regeneration interval.

Figure 2A:
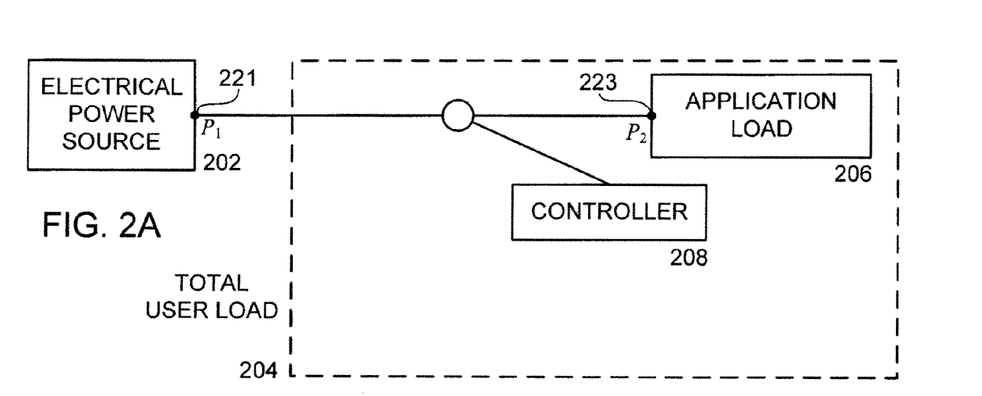
FIG. 2A shows a high-level schematic of a cyclic load drawing electrical power from an electrical power source.

In FIG. 2A, electrical power source 202 feeds total user load 204. In this example, total user load 204 comprises application load 206. Controller 208 controls the electrical power transferred between electrical power source 202 and application load 206. Electrical power $P_1$ 221 represents the output electrical power from electrical power source 202. Electrical power $P_2$ 223 represents the input electrical power drawn by application load 206, which, in this example, is a cyclic load. The input electrical power required to operate a load is also referred to as the electrical power demand of the load.

Figure 2B:
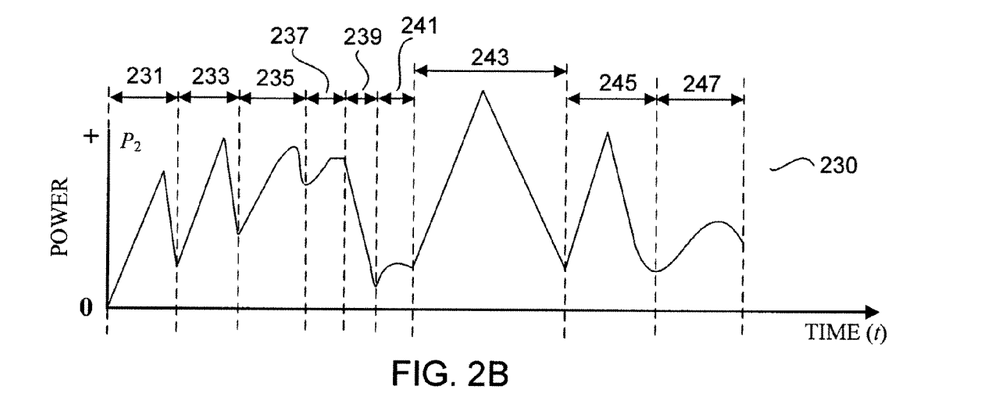
FIG. 2B shows a plot of the power demand of a cyclic load with no regeneration.

FIG. 2B shows plot 230 of the electrical power demand $P_2$ 223 (vertical axis) of application load 206 as a function of time t (horizontal ax)s). In this example. $P_2$ ranges from zero to positive values. When the electrical power demand is positive, application load 206 is drawing electrical power. Plot 230 is a generic plot used for illustration. The actual power demand is dependent on the specific equipment and operating conditions. For simplicity, many portions of plot 230 are shown as straight line segments. In general, the shape is arbitrary (for example, curvilinear).

In FIG. 2B, cycle 231-cycle 247 are examples of cycles. Note that the cycles are not necessarily strictly periodic. The functional dependence of power vs. time, the amplitude, and the duration of each cycle may vary. In addition to up/down variations, a cycle may include other geometric features, such as a plateau (constant power) in cycle 237 and a cusp in cycle 241.

Figure 2C:
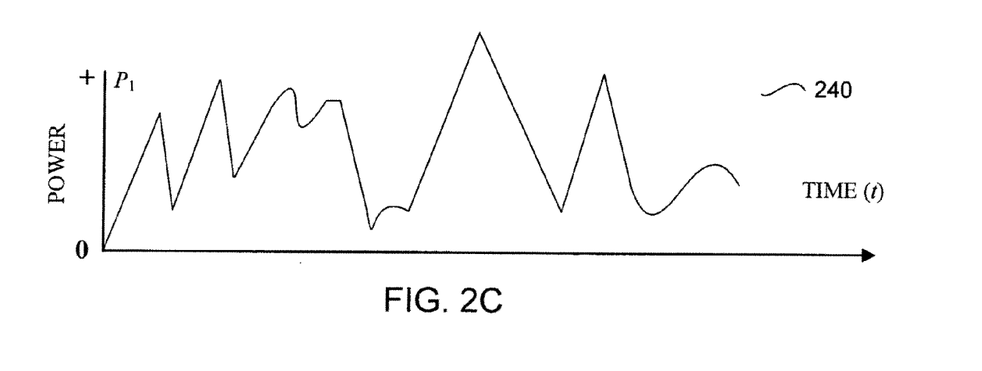
FIG. 2C shows a plot of the output power drawn from the electrical power source shown in FIG. 2A corresponding to the plot of power demand shown in FIG. 2B.

FIG. 2C shows the corresponding plot 240 of the output electrical power $P_1$ 221 (vertical axis) from electrical power source 202. When the output electrical power is positive, electrical power is drawn from electrical power source 202. In the example shown, the output electrical power $P_1$ 221 (plot 240 in FIG. 2C) is equal to the electrical power demand $P_2$ 223 (plot 230 in FIG. 2B).

Figure 2D:
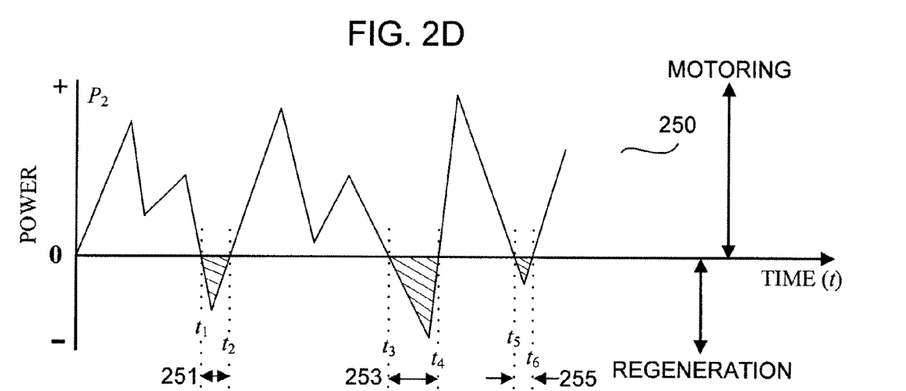
FIG. 2D shows a plot of the power demand of a cyclic load with regeneration.

FIG. 2D shows a different example, plot 250, of the electrical power demand $P_2$ 223 (vertical axis) of application load 206 as a function of time t (horizontal axis). Note that the power ranges from positive to negative values. When the electrical power demand is positive (motoring region), application load 206 is drawing electrical power. When the electrical power demand is negative (regeneration region), application load 206 is generating electrical power. As shown in plot 250, application load 206 generates electrical power during time interval 251 ($t_1 \leq t \leq t_2$), time interval 253 ($t_3 \leq t \leq t_4$), and time interval 255 ($t_5 \leq t \leq t_6$).

Figure 2E:
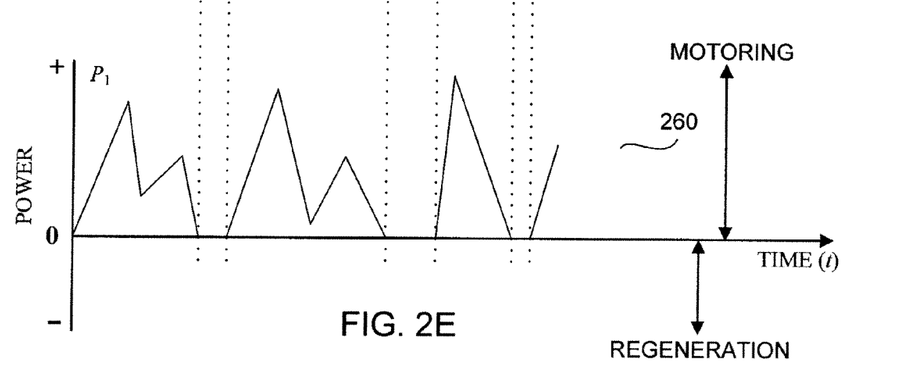
FIG. 2E shows a plot of the output power drawn from the electrical power source in FIG. 2A corresponding to the plot of power demand shown in FIG. 2D.

FIG. 2E shows the corresponding plot 260 of the output electrical power $P_1$ 221 (vertical axis) from electrical power source 202. When the output electrical power is positive, electrical power is drawn from electrical power source 202. When the output electrical power is negative, electrical power is fed back into electrical power source 202. In the example shown, in the motoring region, the output electrical power $P_1$ 221 (plot 260 in FIG. 2E) is equal to the electrical power demand $P_2$ 223 (plot 250 in FIG. 2D). In the regeneration region (time interval 251, time interval 253, and time interval 255), the output electrical power $P_1$ 221 is zero. In this example, the electrical power generated in the regeneration region is fed into a resistor (not shown) and converted to waste heat. The electrical power generated in the regeneration region may also be fed back to electrical power source 202. The output electrical power $P_1$ 221 would then be negative during time interval 251, time interval 253, and time interval 255.

Figure 3A:
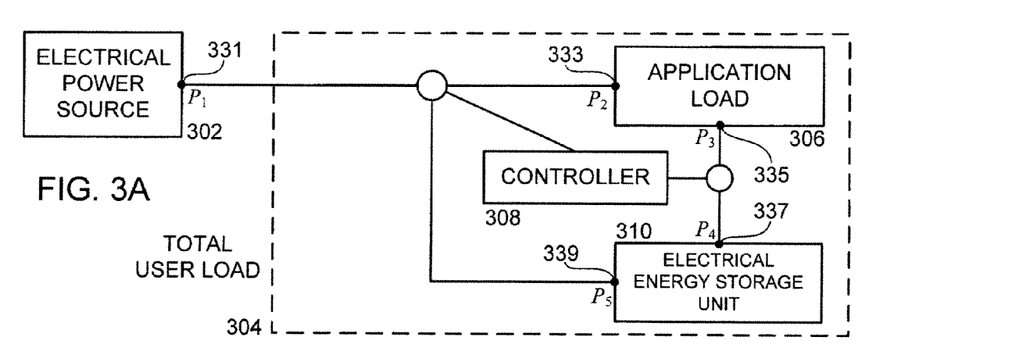
FIG. 3A shows a high-level schematic of a cyclic load drawing electrical power from an electrical power source and an electrical energy storage unit.

FIG. 3A shows a schematic of an electrical power system, according to an embodiment of the invention, that recaptures the electrical power generated in the regeneration region. Electrical power source 302 feeds total user load 304. In this example, total user load 304 comprises application load 306 and electrical energy storage unit 310. Controller 308 controls the electrical power transferred between electrical power source 302 and application load 306, between electrical power source 302 and electrical energy storage unit 310, and between application load 306 and electrical energy storage unit 310. Electrical power $P_1$ 331 represents the output electrical power from electrical power source 302. Electrical power $P_2$ 333 represents the input electrical power drawn by application load 306, which, in this example, is a cyclic load. Electrical power $P_3$ 335 represents the electrical power generated by application load 306 in the regeneration region. Electrical power $P_4$ 337 represents the electrical power received by electrical energy storage unit 310 from application load 306. Electrical power $P_5$ 339 represents the output electrical power from electrical energy storage unit 310.

An example of electrical energy storage unit 310 is an ultracapacitor, which is characterized by high power densities. For increased electrical energy storage, multiple ultracapacitors may be connected in series and parallel to form an ultracapacitor bank. Electrical current flowing into an ultracapacitor charges the ultracapacitor, and electrical energy is stored via charge separation at an electrode-electrolyte interface. The stored electrical energy may then later be used to output an electrical current. In FIG. 3A, electrical power $P_3$ 335 generated by application load 306 may be fed as electrical power $P_4$ 337 to charge electrical energy storage unit 310. In addition, electrical power $P_1$ 331 output by electrical power source 302 may be fed as electrical power $P_5$ 339 to charge electrical energy storage unit 310.

Figure 3B:
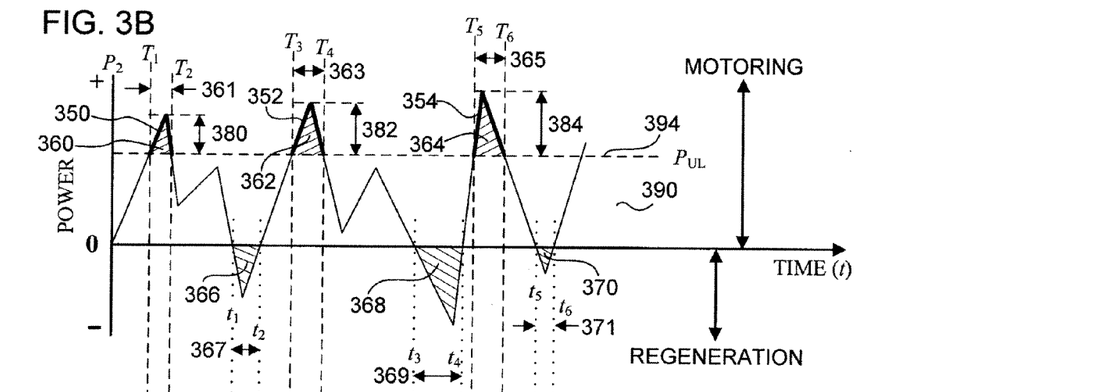
FIG. 3B shows a plot of the power demand of a cyclic load with regeneration.

FIG. 3B shows plot 390 of the electrical power demand $P_2$ 333 (vertical axis) of application load 306 as a function of time t (horizontal axis). Note that, in this example, the power ranges from positive to negative values. When the electrical power demand is positive (motoring region), application load 306 is drawing electrical power. When the electrical power demand is negative (regeneration region), application load 306 is generating electrical power. As shown in plot 390, application load 306 generates electrical power during time interval 367 ($t_1 \leq t \leq t_2$), time interval 369 ($t_3 \leq t \leq t_4$), and time interval 371 ($t_5 \leq t \leq t_6$). Since energy is the integral of power over time, area 366, area 368, and area 370 represent the electrical energy generated by application load 306 during time interval 367, time interval 369, and time interval 371, respectively. This electrical energy is stored in electrical energy storage unit 310.

Figure 3C:
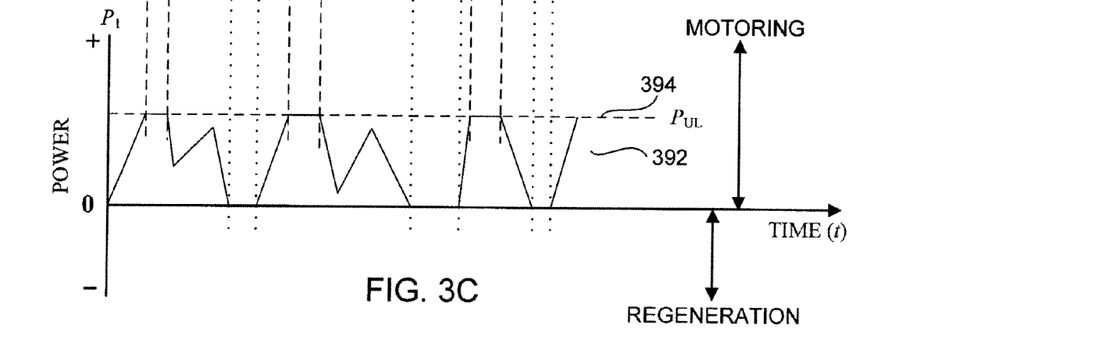
FIG. 3C shows a plot of the output power drawn from the electrical power source shown in FIG. 3A corresponding to the plot of power demand shown in FIG. 3B.

In an embodiment of the invention, electrical power drawn from electrical energy storage unit 310 is used to reduce peak electrical power drawn from electrical power source 302. FIG. 3C shows the plot 392 of the output electrical power $P_1$ 331 (vertical axis) from electrical power source 302. In this example, the lower limit of $P_1$ 331 is zero. As discussed in examples below, the lower limit may also be greater than zero or less than zero, depending on the cycle and the storage capacity of electrical energy storage unit 310. When the output electrical power is positive, electrical power is drawn from electrical power source 302. When the output electrical power is negative, electrical power is fed back into electrical power source 302. In the example shown, in the motoring region, an upper limit $P_{UL}$ 394 is placed on the output electrical power $P_1$ 331. For values of $P_2 \leq P_{UL}$ (plot 390 in FIG. 3B), $P_2$ is supplied only by $P_1$. For values of $P_2 > P_{UL}$, $P_1$ supplies a value of $P_{UL}$. The additional electrical power required is supplied by $P_5$ 339 drawn from electrical energy storage unit 310.

Referring to FIG. 3B, $P_2$ is greater than $P_{UL}$ during time interval 361 ($T_1 \leq t \leq T_2$), time interval 363 ($T_3 \leq t \leq T_4$), and time interval 365 ($T_5 \leq t \leq T_6$). Note that the difference $P_2-P_{UL}$ are represented by pulses, referenced as pulse 350, pulse 352, and pulse 354, respectively. The pulse amplitudes are referenced as amplitude 380, amplitude 382, and amplitude 384, respectively. The energy drawn within each pulse is referenced as pulse energy 360, pulse energy 362, and pulse energy 364, respectively. As discussed above, energy is represented by area in a power vs. time plot. In the example shown, the pulses have a triangular shape. In general, the pulse shape may vary, depending on the application load and operating conditions and other factors.

In an embodiment of the invention, the electrical energy storage unit 310 is configured such that it may supply all pulse energy required during the operation of application load 306. Parameters to be considered in configuring the electrical energy storage unit 310 include pulse amplitude, pulse width, pulse shape, and time interval between pulses. If $P_3$ is not sufficient to maintain adequate charge in electrical energy storage unit 310, $P_1$ may also be used during off-peak periods to charge electrical energy storage unit 310.

Figure 3D:
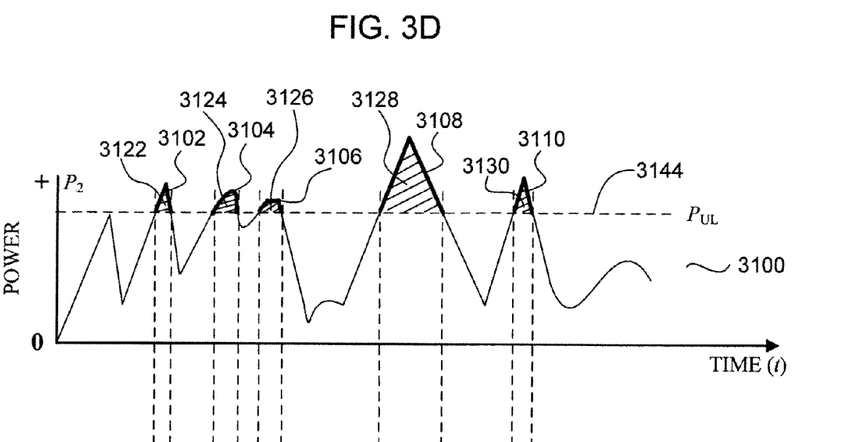
FIG. 3D shows a plot of the power demand of a cyclic load with no regeneration.

In an embodiment of the invention, if application load 306 operates only in the motoring region (no regeneration), electrical energy storage unit 310 may be charged entirely $P_1$ 331 from electrical power source 302. The charging may occur during off-peak demand to limit the power $P_1$ 331 from electrical power source 302 during peak demand. FIG. 3D shows plot 3100 of the electrical power demand $P_2$ 333 (vertical axis) of application load 306 as a function of time t (horizontal axis). In this example, $P_2$ ranges from zero to positive values. When the electrical power demand is positive, application load 306 is drawing electrical power.

Figure 3E:
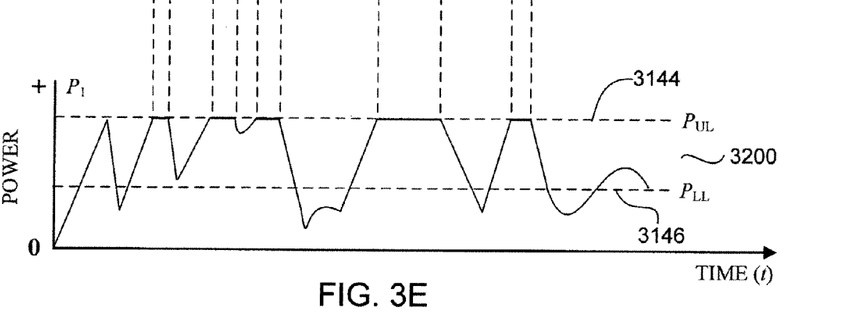
FIG. 3E shows a plot of the output power drawn from the electrical power source in FIG. 3A corresponding to the plot of power demand shown in FIG. 3D.

FIG. 3E shows the plot 3200 of the output electrical power $P_1$ 331 (vertical axis) from electrical power source 302. When the output electrical power is positive, electrical power is drawn from electrical power source 302. In the example shown, an upper limit $P_{UL}$ 3144 is placed on the output electrical power $P_1$ 331. For values of $P_2 \leq P_{UL}$ (plot 3100 in FIG. 3D), $P_2$ is supplied only by $P_1$. For values of $P_2 > P_{UL}$, $P_1$ supplies a value of $P_{UL}$. The additional electrical power required is supplied by $P_5$ 339 drawn from electrical energy storage unit 310. In FIG. 3D, note that $P_2 > P_{UL}$ for pulse 3102-pulse 3110. The corresponding pulse energies are pulse energy 3122-pulse energy 3130, respectively, which are supplied by electrical energy storage unit 310. Note that a positive lower limit $P_{LL}$ 3146 (FIG. 3E) may be placed on the output electrical power $P_1$ 331. Advantages of maintaining a lower limit are discussed below.

Electrical drive motors used in mining excavators typically operate on 3-phase alternating current (AC). Mining excavators are typically powered from an electrical power distribution network feeding high-voltage AC power through high-voltage armored trail cables to the primary side of a drive power transformer; more than one drive power transformer may be used. A drive power transformer has multiple secondary windings which supply power to a regenerative boost rectifier system through line reactors. Such a rectifier system may comprise active front ends (AFEs). The active front ends are pulse-width modulated isolated gate bipolar transistor (IGBT) rectifiers that convert the incoming AC into direct current (DC) and store the energy in low inductive DC link capacitors. A regenerative rectifier system may also be implemented with silicon-controlled rectifier (SCR) bridges. The number of drive power transformers and the number of active front ends depend on the total power requirement of the drive motors. Power electronic inverters invert the DC voltage available at the DC link to AC voltages that feed the motors.

Electrical energy regenerated by the motors may be fed back to the public utility electrical grid by the active front ends. Under a line side fault condition, however, the active front end may not be able to send back all the regenerated energy to the public utility electrical grid, and the machine needs to shut down. The regenerated energy which could not be fed back to the public utility electrical grid may lead to an increase in the DC link voltage. Since high DC link voltages may damage components, and also pose a safety hazard, protective circuits such as DC choppers and crowbars are added to the system to suppress excessive DC link voltages during regeneration. In this instance, electrical energy is converted to waste heat. As discussed below, in an embodiment of the invention, regenerated electrical energy is stored in an ultracapacitor bank and used to supplement the power to the drive motors during peak demand.

Figure 4:
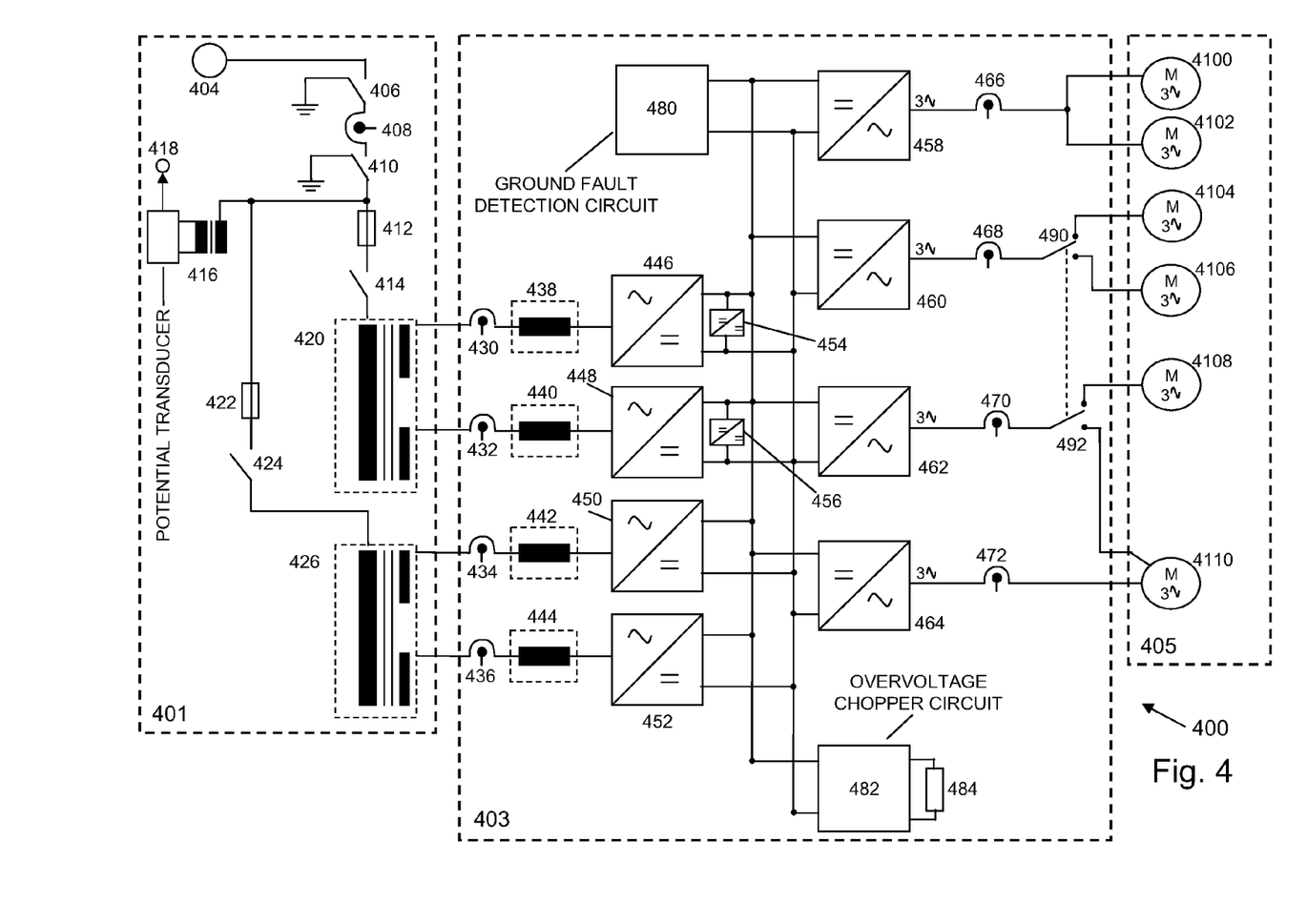
FIG. 4 shows a single-line diagram of an electric shovel control system.

FIG. 4 shows a single-line diagram of electric shovel control system 400. Block 401 represents input electrical power plant. Block 403 represents electrical power converters. Block 405 represents electrical drive motors.

Referring to block 405, electric shovel 100 is equipped with six electrical drive motors, referenced as motor 4100-motor 4110. Each motor runs on 3-phase alternating current (AC).

In the example shown in block 401, electrical power is directly fed from a public utility electrical power grid via substation 404 supplying 3-phase AC power at a voltage of 3.3 or 6.6 kV. Substation 404 is connected via switch 406 to current transducer 408 and switch 410. Power is supplied via fuse 412 and switch 414 to the primary side of drive power transformer 420. Similarly, power is supplied via fuse 422 and switch 424 to the primary side of drive power transformer 426. Potential transducer 416 generates a synchronizing voltage feedback signal 418.

Referring to block 403, one output from the secondary side of drive power transformer 420 is connected via current transducer 430 and active front end (AFE) choke/reactor 438 to AFE AC-to-DC converter 446. A second output from the secondary side of drive power transformer 420 is connected via current transducer 432 and AFE choke/reactor 440 to AFE AC-to-DC converter 448. Similarly, one output from the secondary side of drive power transformer 426 is connected via current transducer 434 and AFE choke/reactor 442 to AFE AC-to-DC converter 450. A second output from the secondary side of drive power transformer 426 is connected via current transducer 436 and AFE choke/reactor 444 to AFE AC-to-DC converter 452. Output DC voltages are monitored by potential transducer 454 and potential transducer 456.

DC power from the outputs of AFE AC-to-DC converter 446-AFE AC-to-DC converter 452 is fed to the inputs of AFE DC-to-AC inverter 458-AFE DC-to-AC inverter 464. Block 480 represents a ground fault detection circuit. Block 482 represents an overvoltage chopper circuit that dissipates excess electrical energy through resistor 484. The outputs of AFE DC-to-AC inverter 458-AFE DC-to-AC inverter 464 are connected through current transducer 466-current transducer 472, respectively, to motor 4100-motor 4110. Switching drive power between different motors may be performed via transfer switch 490/492.

Figure 5:
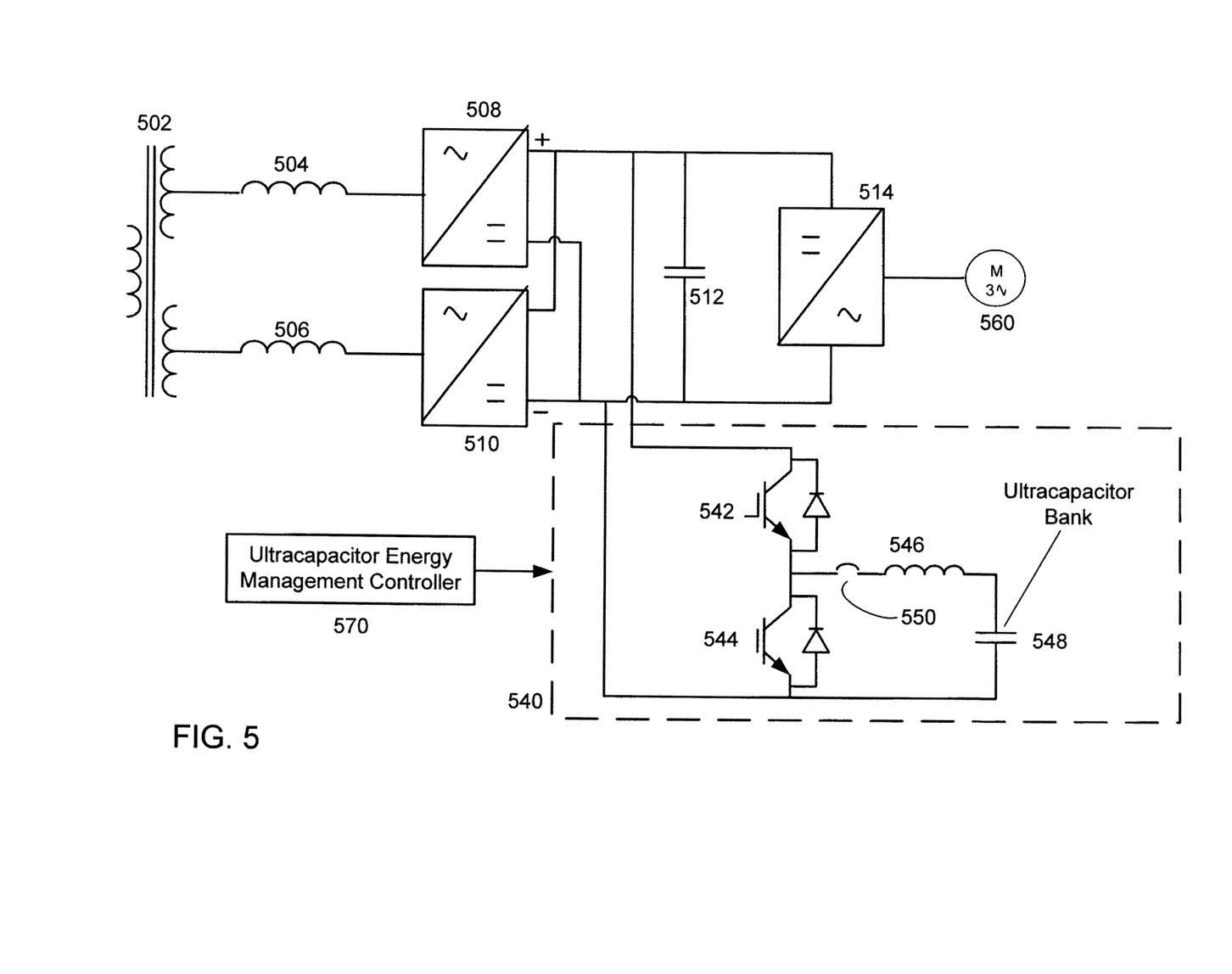
FIG. 5 shows a schematic of an electrical power system with an integrated ultracapacitor bank.

FIG. 5 shows a schematic of an ultracapacitor bank electrical energy storage unit integrated into an existing electrical power converter system. The existing electrical power converter system is represented by drive power transformer 502, AFE choke/reactor 504, AFE choke/reactor 506, AFE 508, AFE 510, DC link 512 and inverter 514. Motor 560 represents a cyclic load. As previously shown in FIG. 4, inverter 514 may feed more than one motor. The ultracapacitor electrical energy storage unit 540 comprises DC-to-DC converter 542/544, choke/reactor 546, and ultracapacitor bank 548. The ultracapacitor electrical energy storage unit 540 may be disconnected from the electrical power converter system via disconnect switch 550. The ultracapacitor electrical energy storage unit 540 is managed by ultracapacitor energy management controller 550.

Figure 6:
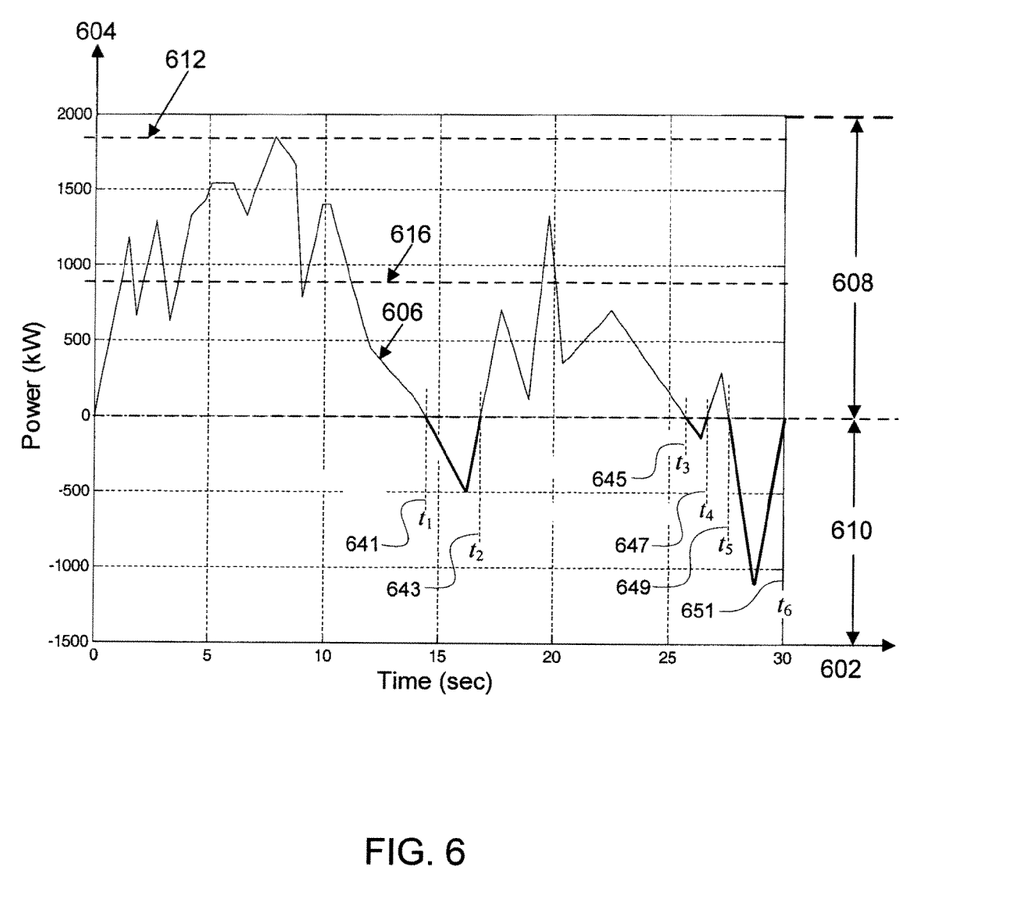
FIG. 6 shows a plot of the power demand of an electric shovel.

Note that a mining excavator with a system of multiple electric motors may be viewed as a single unified cyclic load that operates during motoring intervals and regeneration intervals. The electric shovel 100 in FIG. 1 appears as a cyclic load to the public utility electrical grid governed by a duty cycle. FIG. 6 shows an example of a power cycle for electric shovel 100 over a 30-sec duty cycle. The horizontal axis 602 represents time in seconds (sec). The vertical axis 604 represents power in kilowatts (kW). Plot 606 represents the power demand of electric shovel 100.

In this example, note that on vertical axis 604, the power ranges from positive values to negative values. For positive values, indicated by motoring region 608, the electric shovel 100 is drawing power. For negative values, indicated by regeneration region 610, the electric shovel 100 is generating power. In the duty cycle shown in FIG. 6, there are three time intervals during which electric shovel 100 operates in the regeneration region 610: $t_1$ 641-$t_2$ 643, $t_3$ 645-$t_4$ 647, and $t_5$ 649-$t_6$ 651.

The maximum power demand presented by electric shovel 100 is $P_{max}$ 612. In the standard electrical power converter system, all power is supplied by drive power transformer 502 (FIG. 5). Therefore, in motoring region 608, plot 606 also represents the power supplied by drive power transformer 502. In an embodiment of the invention, the maximum power supplied by drive power transformer 502 is set at a user-defined value $P_{UL}$ 616 (UL=Upper Limit). In an embodiment of the invention, during the time intervals in which peak demand exceeds $P_{UL}$ 616, the power exceeding $P_{UL}$ 616 is supplied by the ultracapacitor bank 546. One skilled in the art may set the value of $P_{UL}$ 616 according to specific equipment and applications.

Figure 7:
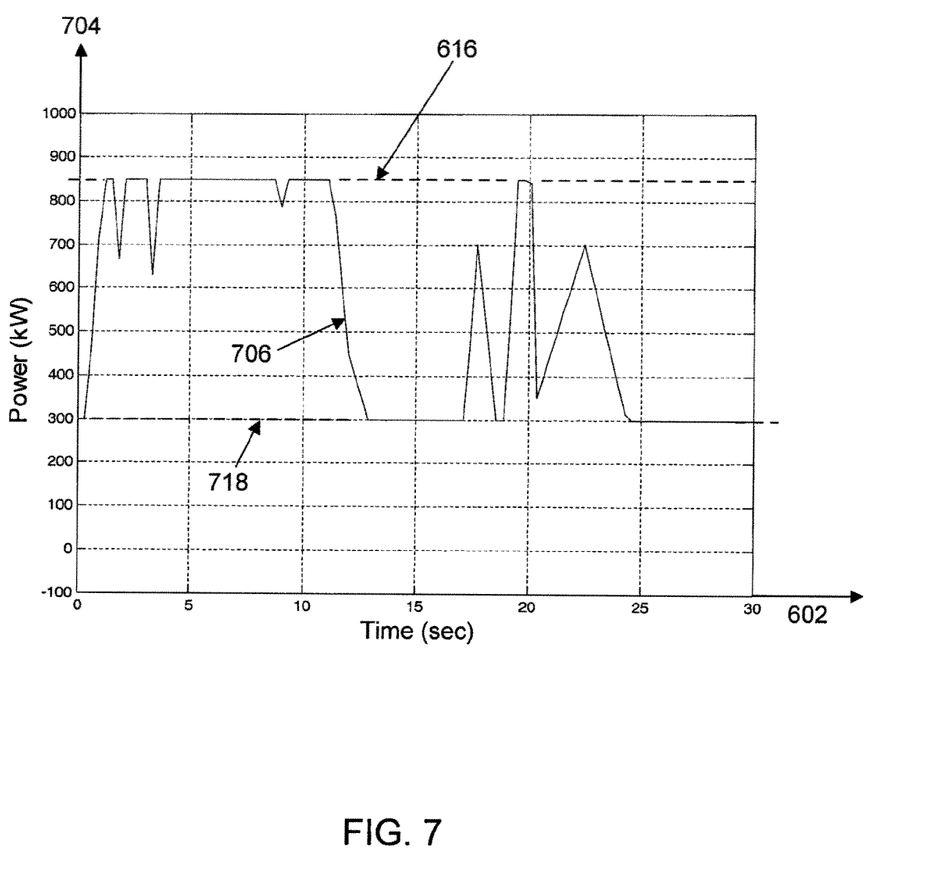
FIG. 7 shows a plot of the output power drawn from an electrical power source when the output power is constrained between an upper limit and a lower limit.

FIG. 7 shows a modified power profile of drive power transformer 502. The horizontal axis 602 represents the 30-sec duty cycle previously shown in FIG. 6. The vertical axis 704 represents power in kilowatts (kW). Plot 706 represents the power delivered by drive power transformer 502. Note that the power falls between $P_{UL}$ 616 and $P_{LL}$ 718 (LL=Lower Limit). The lower limit $P_{LL}$ 718 may be set to zero, a negative value, or a positive value. The lower limit is set to zero if drive power transformer 502 delivers zero power during a regeneration interval, and all regenerated electrical energy is stored in ultracapacitor bank 546. The lower limit is set to a negative value if the capacity of ultracapacitor bank 546 is not sufficient to store all of the regenerated electrical energy: a portion of the regenerated electrical energy is stored in ultracapacitor bank 546, and a portion of the regenerated electrical energy is returned to the public utility electrical grid. The lower limit is set to a positive value (as shown in the example in FIG. 7) if the regenerated electrical energy is not sufficient to fully charge ultracapacitor bank 546: electrical power from drive power transformer 502 is also used to charge ultracapacitor bank 546 during off-peak intervals. Note that line power ripple is decreased as $P_{LL}$ 718 is increased. It is therefore advantageous to set $P_{LL}$ 718 as high as possible, consistent with the duty cycle and voltage of electrical energy storage unit 310. One skilled in the art may set the value of $P_{LL}$ 718 according to specific equipment and applications.

Figure 8:
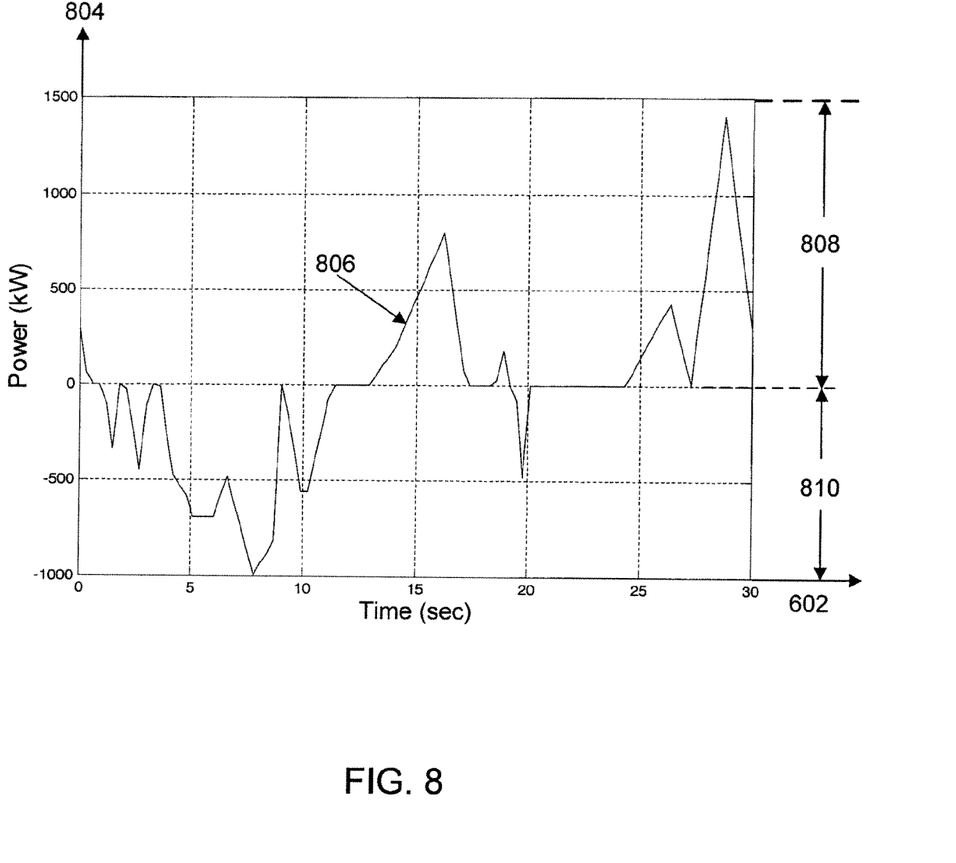
FIG. 8 shows a plot of the output power drawn from an ultracapacitor bank.

FIG. 8 shows the corresponding ultracapacitor power profile. The horizontal axis 602 represents the 30-sec duty cycle previously shown in FIG. 6. The vertical axis 804 represents power in kilowatts (kW). Plot 806 represents the power profile of ultracapacitor bank 546 (FIG. 5). Note that on vertical axis 804, the power ranges from positive values to negative values. For positive values, indicated by regeneration region 808, the ultracapacitor bank 546 is drawing power (charging the ultracapacitor bank). For negative values, indicated by motoring region 810, the ultracapacitor bank 546 is generating power (discharging the ultracapacitor bank).

Figure 9:
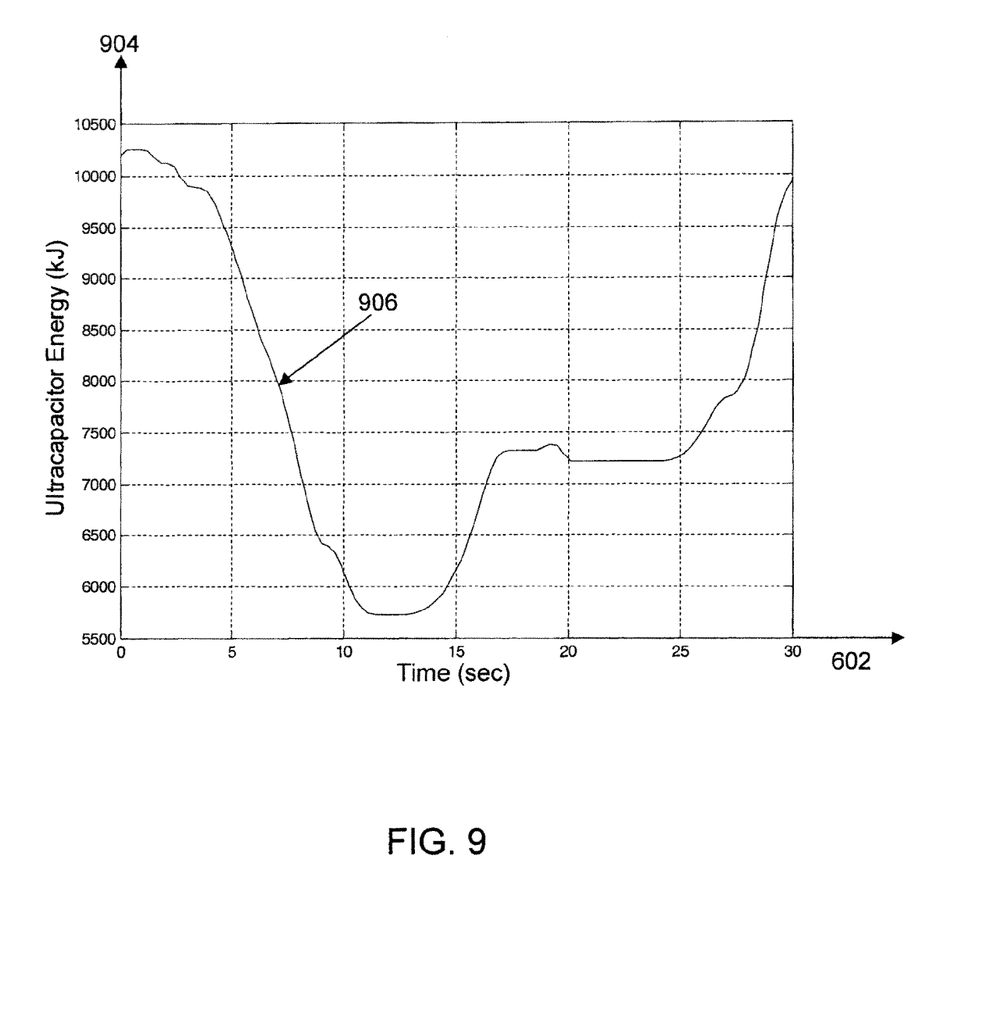
FIG. 9 shows a plot of the stored electrical energy in an ultracapacitor bank.

FIG. 9 shows the energy stored in the ultracapacitor system. The horizontal axis 602 represents the 30-sec duty cycle previously shown in FIG. 6. The vertical axis 904 represents energy in kilojoules (kJ). Plot 906 is calculated by integrating the power (represented by plot 806 in FIG. 8) as a function of time. This data is used for proper sizing of ultracapacitor bank 546. Once the ultracapacitor bank 546 has the required energy stored, additional energy, if available, could be sent back to the public utility electrical grid. In one example, the operating voltage of the ultracapacitor system is approximately 1400 to 1800 volts, and the total capacitance of the ultracapacitor system is approximately 4.5 to 9 farads. One skilled in the art may set design requirements for the ultracapacitor system according to specific equipment and applications.

Figure 10:
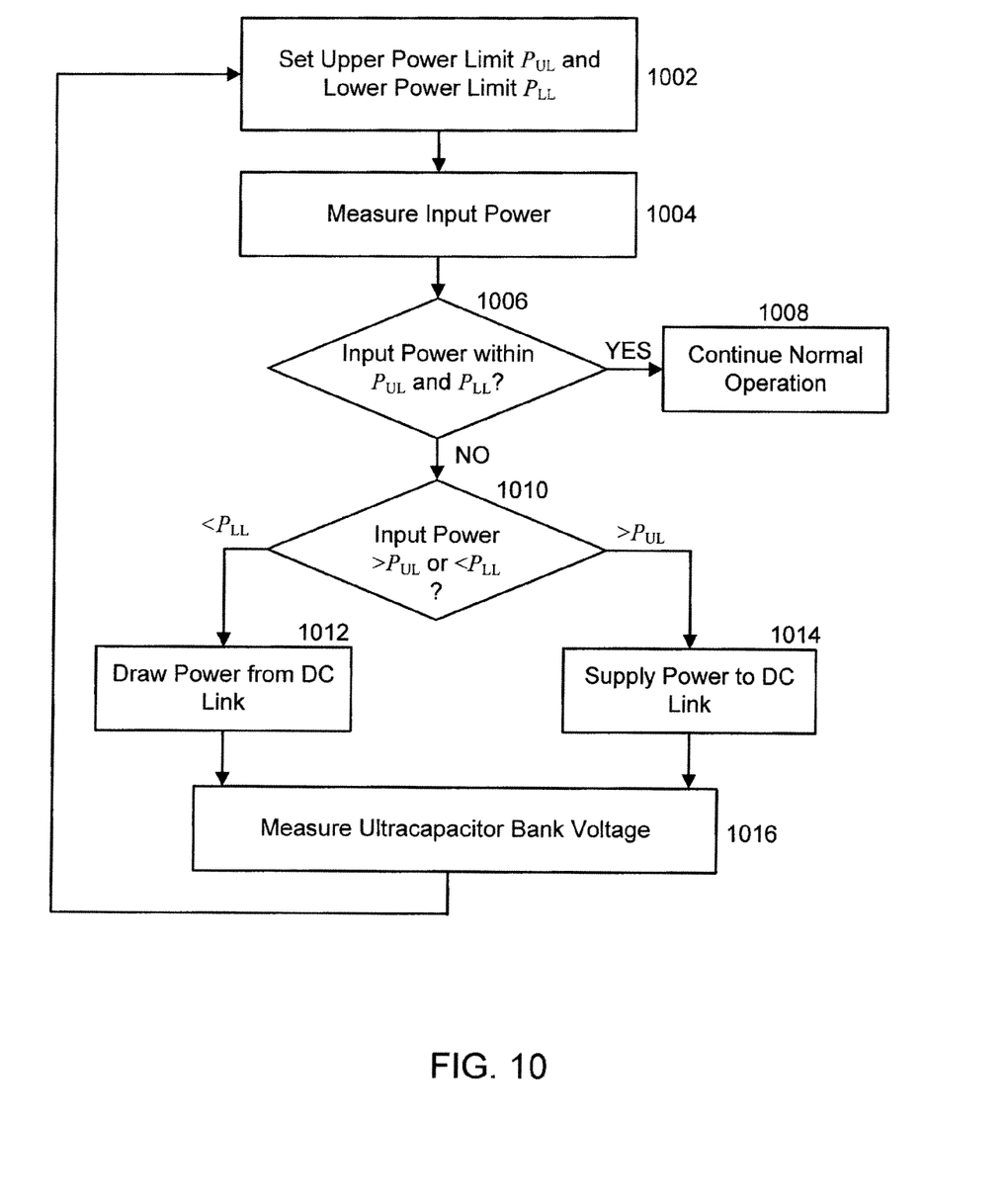
FIG. 10 shows a flowchart of steps for limiting the input power between an upper limit and a lower limit.

FIG. 10 is a flowchart summarizing steps for limiting the power drawn from an electrical power source by a cyclic load. In step 1002, the upper power limit $P_{UL}$ and the lower power limit $P_{LL}$ are set. The process then passes to step 1004, in which the input power drawn by the cyclic load is measured. The process then passes to step 1006, in which the measured input power drawn by the cyclic load is compared to the upper and lower power limits of the electrical power source. If the measured input power drawn by the cyclic load falls within the upper and lower power limits, then the process passes to step 1008, in which normal operation continues. If the measured input power drawn by the cyclic load does not fall within the upper and lower power limits, then the process passes to step 1010, in which the measured input power drawn by the cyclic load is compared to the upper power limit $P_{UL}$ and the lower power limit $P_{LL}$. If the measured input power drawn by the cyclic load is greater than the upper power limit $P_{UL}$, the process then passes to step 1014, in which the ultracapacitor bank supplies power to the DC link. If the measured input power drawn by the cyclic load is less than the lower power limit $P_{LL}$, the process then passes to step 1012, in which the ultracapacitor bank draws power from the DC link. As discussed above, the ultracapacitor bank may be charged from the electrical power source. If the cyclic load operates in both a motoring region and a regeneration region, the ultracapacitor bank may also be charged from electrical power generated by the cyclic load.

Upon completion of either step 1012 or step 1014, the process passes to step 1016, in which the voltage across the ultracapacitor bank is monitored. The process then returns to step 1002, in which the upper power limit and the lower power limit are reset if needed.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transferring electrical power, the method comprising:
  receiving a first electrical power regenerated from an electrical motor operating during a regeneration interval;
  converting the first electrical power to a direct-current electrical power;
  feeding a direct-current link with the direct-current electrical power; and
  transferring a second electrical power from the direct-current link to an electrical power grid.

2. The method of claim 1, wherein transferring a second electrical power from the direct-current link to an electrical power grid comprises:
  converting the second electrical power to an alternating-current electrical power; and
  transferring the alternating-current electrical power to the electrical power grid.

3. The method of claim 2, wherein converting the second electrical power to an alternating-current electrical power is performed by an active front end.

4. The method of claim 1, wherein the electrical power grid comprises a public utility electrical power grid.

5. A method for transferring electrical power, the method comprising:
  receiving a first electrical power regenerated from an electrical motor operating during a regeneration interval;
  converting the first electrical power to a direct-current electrical power;
  feeding a direct-current link with the direct-current electrical power;
  determining a charge of an electrical energy storage unit;
  upon determining that the charge is less than a user-defined charge limit, transferring a second electrical power from the direct-current link to the electrical energy storage unit; and
  upon determining that the charge is greater than or equal to the user-defined charge limit, transferring the second electrical power from the direct-current link to an electrical power grid.

6. The method of claim 5, wherein transferring the second electrical power from the direct-current link to an electrical power grid comprises:
  converting the second electrical power to an alternating-current electrical power; and
  transferring the alternating-current electrical power to the electrical power grid.

7. The method of claim 6, wherein converting the second electrical power to an alternating-current electrical power is performed by an active front end.

8. The method of claim 5, wherein the electrical energy storage unit comprises an ultracapacitor.

9. The method of claim 5, wherein the electrical power grid comprises a public utility electrical power grid.

10. A system for transferring electrical power, the system comprising:
  an electrical power conversion system configured to:
    receive a first electrical power regenerated from an electrical motor operating during a regeneration interval; and
    convert the first electrical power to a direct-current electrical power;
  a direct-current link operatively coupled to the electrical power conversion system, wherein the direct-current link is configured to receive the direct-current electrical power; and
  an active front end operatively coupled to the direct-current link, wherein the active front end is configured to:
    receive a second electrical power from the direct-current link;
    convert the second electrical power to an alternating-current electrical power; and
    transfer the alternating-current electrical power to an electrical power grid.

11. The system of claim 10, further comprising a controller, wherein:
  the controller is operatively coupled to the direct-current link;
  the controller is operatively coupled to the active front end; and
  the controller is configured to:
    determine a third electrical power drawn by an application load from the direct-current link; and
    upon determining that the third electrical power is less than a user-defined electrical power limit, transfer the second electrical power to the active front end.

12. The system of claim 10, wherein the electrical power grid comprises a public utility electrical power grid.

13. A system for transferring electrical power, the system comprising:
  an electrical power conversion system configured to:
    receive a first electrical power regenerated from an electrical motor operating during a regeneration interval; and convert the first electrical power to a direct-current electrical power;
a direct-current link operatively coupled to the electrical power conversion system, wherein the direct-current link is configured to receive the direct-current electrical power;
an electrical energy storage unit operatively coupled to the direct-current link, wherein the electrical energy storage unit is configured to receive a second electrical power from the direct-current link; and
an active front end operatively coupled to the direct-current link, wherein the active front end is configured to:
receive a third electrical power from the direct-current link;
convert the third electrical power to an alternating-current electrical power; and
transfer the alternating-current electrical power to an electrical power grid.

14. The system of claim 13, further comprising a controller, wherein:
the controller is operatively coupled to the direct-current link;
the controller is operatively coupled to the electrical energy storage unit;
the controller is operatively coupled to the active front end; and
the controller is configured to:
determine a charge of the electrical energy storage unit;
upon determining that the charge is less than a user-defined charge limit, transfer the second electrical power from the direct-current link to the electrical energy storage unit; and
upon determining that the charge is greater than or equal to the user-defined charge limit, transfer the third electrical power from the direct-current link to the active front end.

15. The system of claim 13, further comprising a controller, wherein:
the controller is operatively coupled to the direct-current link;
the controller is operatively coupled to the electrical energy storage unit;
the controller is operatively coupled to the active front end; and
the controller is configured to:
determine a fourth electrical power drawn by an application load from the direct-current link; and
upon determining that the fourth electrical power is less than a user-defined power limit:
determine a charge of the electrical energy storage unit;
upon determining that the charge is less than a user-defined charge limit, transfer the second electrical power from the direct-current link to the electrical energy storage unit; and
upon determining that the charge is greater than or equal to the user-defined charge limit, transfer the third electrical power from the direct-current link to the active front end.

16. The system of claim 13, wherein the electrical energy storage unit comprises an ultracapacitor.

17. The system of claim 13, wherein the electrical power grid comprises a public utility electrical power grid.

\* \* \* \* \*